Oct. 10, 1967  R. J. SHAFRANEK  3,346,749
SELF-EXCITED BRUSHLESS ALTERNATOR
Filed Feb. 2, 1965
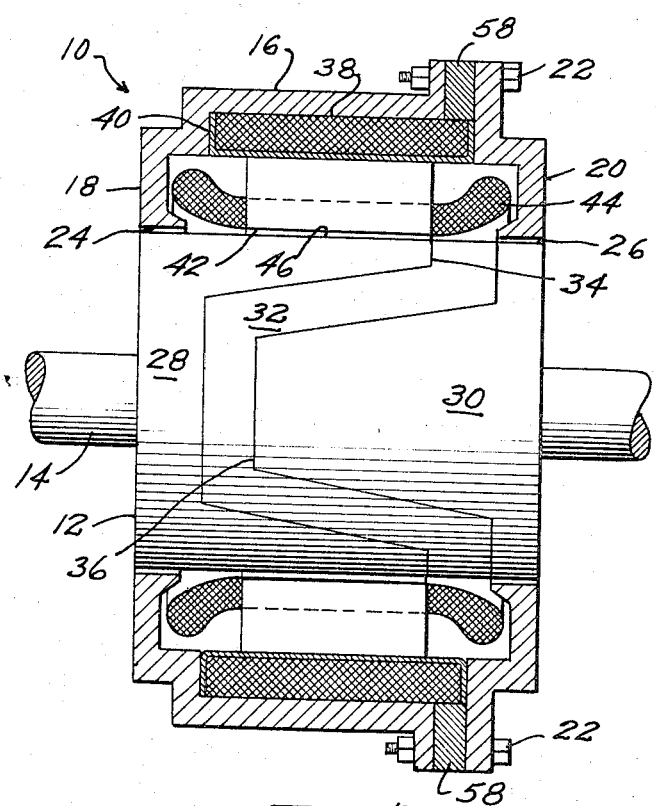
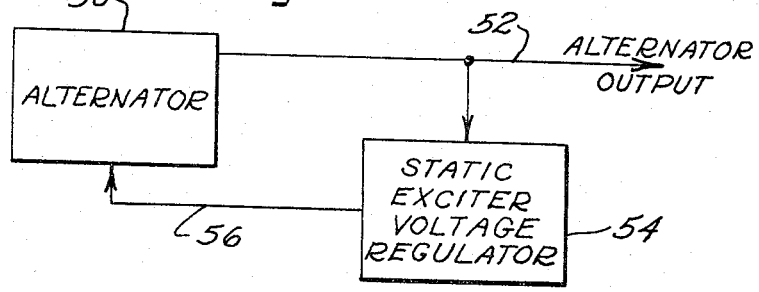
INVENTOR.
Robert J. Shafranek
BY Hill, Sherman, Meroni, Gross & Simpson
ATTORNEYS United States Patent Office 3,346,749
Patented Oct. 10, 1967

3,346,749
SELF-EXCITED BRUSHLESS ALTERNATOR
Robert J. Shafranek, Kent, Ohio, assignor to TRW Inc., a corporation of Ohio
Filed Feb. 2, 1965, Ser. No. 429,717
17 Claims. (Cl. 310—263)

ABSTRACT OF THE DISCLOSURE

An alternator which is generally formed of a cylindrical housing having a pair of end walls extending radially inwardly from opposite ends of the housing, a field winding mounted within the housing, a permanent magnet mounted between opposite end walls, a stator mounted within the housing, and a rotor mounted for rotation within the housing. The field winding and the permanent magnet induce a north magnetic pole in one of the end walls and a south magnetic pole in the other of the end walls. The rotor includes a pair of poles each magnetically coupled to a respective one of the end walls and to the stator. The stator includes a power winding. Means are provided for connecting an output of the power winding to the field winding.

---

This invention relates generally to brushless alternators and more particularly to an improved brushless alternator with self starting means for developing excitation current for the field windings thereof.

Static exciter-voltage regulators are commonly employed with alternators to control the output voltage therefrom. The alternator output voltage is sensed and the exciter-regulator reacts to this sensed voltage to deliver a fraction of the alternator output power to the alternator excitation or field winding. However, a fundamental problem exists at start up of the alternator, since there is no output power available and, therefore, no power available for excitation of the field windings. Heretofore, rotary exciters have been employed or the field winding has been "flashed" under short time application from a DC power source to provide the initial voltage build up in the alternator. After the alternator has begun to supply output power, self excitation of the field windings may be provided from this output.

In addition to the above shortcomings, alternators have had other difficulties when applied to use in particular applications which require high shaft speeds and high rotor temperatures are produced at such speeds. Another consideration in particular applications is that of the alternator size and weight. The design of the heretofore known alternators which satisfactorily met the required power demands normally resulted in units of prohibitive size and weight.

It is, therefore, an object of the present invention to provide a brushless alternator capable of self excitation.

It is another object of the present invention to provide an alternator which is self excited and is capable of operating at high rotor speeds.

It is still another object of the present invention to provide an alternator which is self excited and operable at high rotor speeds and high operating temperatures.

Yet another object of the present invention is to provide an alternator which is self excited and which is substantially smaller in size and weight as compared to pre-existing devices of this character.

These and other objects, features and advantages of the present invention will be more fully realized and understood from the following detailed description when taken in conjunction with the accompanying drawings, wherein:

FIGURE 1 is a view in longitudinal section of an alternator of the present invention; and FIGURE 2 is a schematic diagram of the alternator of FIGURE 1 and a static exciter-voltage regulator employed therewith to provide excitation current to the field windings.

As shown in FIGURE 1, a brushless alternator constructed in accordance with the present invention includes a housing, generally designated with the reference numeral 10. A rotor 12 is disposed within the housing 10 and is mounted on a shaft 14 which is journalled for rotation within the housing 10. The housing 10. includes a cylindrical portion 16 having a radially inwardly extending wall 18 at one end thereof and an end cap 20 secured by bolts 22 to the opposite end of the portion 16 to define a second radially inwardly extending wall. The housing 10 including the cylindrical portion 16 and the end walls 18, 20 is constructed of magnetic material.

The rotor 12 has a diameter slightly less than the internal diameter of the walls 18, 20 to define parasitic air gaps 24 and 26 respectively. The rotor 12 comprises a pair of sections 28 and 30 of magnetic material separated by a non-magnetic insert 32. The sections 28 and 30 and the insert or separator 32 may be secured together by welding or by other suitable means of non-magnetic material.

The rotor sections 28 and 30 are each formed with a pair of diametrically opposite axially extending finger-like portions 34 and 36 to provide rotor poles for proper magnetic flux distribution. Each finger-like portion of each section is disposed between the portions of the other section. The portions 34, 36 are preferably tapered as illustrated and are separated by the non-magnetic separator or insert 32.

It will be appreciated that a two pole alternator may be constructed, using a single finger extension on each section. Similarly, an alternator having more than four poles may be constructed, by adding additional finger extensions to each section.

A field coil 38 is wound on a cylindrical form 40 of non-magnetic material and is mounted within the housing 10 in adjacent relationship to the cylindrical portion 16. The field or excitation winding 38 induces magnetic flux in the housing 10. Inwardly of the form 40 within the housing 10 is disposed a stator 42 of conventional laminated construction on which power windings 44 are disposed. A rotor pole gap 46 is defined between the stator 42 and the rotor 12.

When a direct current is passed in one direction through the field coil 38, a north magnetic pole is induced in the one end wall 18 of the housing 10 while a south magnetic pole is induced at the other end wall 20. These magnetic poles are induced in the sections 28, 30 of the rotor 12 through the parasitic air gaps 24, 26 respectively. It will be appreciated, of course, that the direction of the current flow through the coil 38 may be reversed, to reverse the poles in the housing 10.

Before a power output can be realized from the alternator, however, power must be made available for excitation of the field windings. As illustrated in FIGURE 2, an alternator 50 has an output thereof developed on a line 52. A static exciter-voltage regulator 54 is employed to control the voltage output of the alternator by connection to the output line 52. The alternator output voltage is sensed and the static exciter-voltage regulator 54 reacts to deliver a fraction of the alternator output power to the alternator excitation or field winding on a line 56. However, initially there is no output power developed by the alternator and, therefore, no power available for excitation of the field winding 38. A rotary exciter may be employed for initially supplying power to the field windings or the field windings may be "flashed" from a DC power source to provide the initial voltage build up in the alternator and, thereby, provide subsequent self excitation during normal operation by means of the static exciter-voltage regulator 54.

The present invention, however, obviates the above-mentioned initial starting conditions by the use of permanent magnet inserts in the magnetic circuit. As illustrated in FIGURE 1, a permanent magnet insert 58 is provided between the cylindrical portion 16 and the end cap or wall 20 of the housing 10 and is retained therein by means of the bolts 22. The permanent magnet insert 58 in the magnetic circuit of the housing 10 eliminates the need for field flashing or for a separate rotating exciter. The permanent magnet insert 58 establishes a relatively low strength magnetic field within the alternator at all times. Therefore, when the alternator rotor is turning, the magnetic excitation produced by the magnet 58 is sufficient to result in some power output from the power winding 44. This power output results in power input to the exciter-voltage regulator 54 which in turn delivers power to the excitation windings 38. As the power to the excitation windings 38 increases, the alternator output voltage increases and in this manner, the alternator output voltage will initially begin to develop at a start up of the alternator until the desired output level is attained.

The magnetic circuit or flux path for the alternator of the present invention is initiated by the permanent magnet insert 58. The flux travels through the cylindrical portion 16 and end wall 18 of the housing 10 and across the parasitic air gap 24 to the section 28 of the rotor 12. The flux travels axially along each of the poles 34 and crosses the rotor air gap 46 to the stator core 42. The flux path then travels circumferentially through the laminated stator core 42 and again crosses the rotor air gap 46 and enters the poles 36 of section 30. The flux again travels axially along the finger-like portions or poles 36 and crosses the parasitic air gap 26 to the end cap or wall 20 of the housing 10. This initial flux path induces sufficient magnetic flux through the power windings 44 to result in a power output from the alternator.

This small amount of power is sensed by the static exciter-voltage regulator 54 and is delivered to the field winding 38 of the alternator 50. As current increases through the field coil 38, the flux in the above described flux path increases causing a subsequent increase in the flux lines cutting the power windings 44. This cycle is regenerative until sufficient flux lines are cutting the power winding 44 to result in the desired power output from the alternator 50 on the lines 52.

Thus, by the present invention, there is provided an alternator which requires no external excitation for initial build up of an output therefrom by the use of a small permanent magnet insert provided in the magnetic housing of the alternator.

The principles of the invention explained in connection with the specific exemplification thereon will suggest many other applications and modifications of the same. It is accordingly desired that, in construing the breadth of the appended claims they shall not be limited to the specific details shown and described in connection with the exemplification thereof.

What is claimed is:
1. An alternator comprising
(a) a stator of magnetic material,
(b) means defining a pair of walls of magnetic material spaced axially from opposite ends of said stator,
(c) field means for inducing a north magnetic pole in one of said walls and a south magnetic pole in the other of said walls,
(d) a rotor journalled for rotation within said stator and including a pair of sections of magnetic material respectively coupled magnetically to said walls, and
(e) a permanent magnet magnetically coupled between said walls and positioned to induce a north magnetic pole in said one wall and a south magnetic pole in said other wall.
2. In an alternator having a housing, a stator disposed in said housing, a rotor journalled for rotation within said housing, and a field winding disposed in said housing for inducing a north magnetic pole in one end and a south magnetic pole in the other end of said housing, the improvement residing therein comprising a permanent magnet mounted in a wall of said housing and positioned to induce a north magnetic pole in said one wall and a south magnetic pole in said other wall.
3. An alternator comprising
(a) a stator of magnetic material,
(b) means defining a pair of walls of magnetic material spaced axially from opposite ends of said stator,
(c) field means for inducing a north magnetic pole in one of said walls and a south magnetic pole in the other of said walls, said field means including a field coil and a permanent magnet each aligned to produce the respective magnetic poles, and
(d) a rotor journalled for rotation within said stator and including a pair of sections of magnetic material coupled magnetically to a respective one of said walls.
4. An alternator comprising
(a) a stator of magnetic material,
(b) a rotor journalled for rotation within said stator and including a pair of poles, and
(c) field means for inducing a flux in a path which extends respectively through one of said poles, said stator, and the other of said poles, said field means including a field winding and a permanent magnet each aligned to produce the flux in the same direction.
5. An alternator comprising
(a) a stator including a power winding,
(b) a rotor journalled for rotation within said stator,
(c) means for inducing lines of flux through said rotor and power winding including a field winding and a permanent magnet magnetically aligned with one another to additively produce the lines of flux, and
(d) means connecting an output of said power winding to said field winding.
6. The alternator defined in claim 5 wherein said connecting means supplies a fraction of the output of said power winding to said field winding.
7. An alternator comprising
(a) a stator including a power winding,
(b) a rotor including a pair of poles magnetically separated from one another and each magnetically coupled to said stator, said rotor journalled for rotation within said stator, and
(c) means for inducing lines of flux through said power windings including a field winding and a permanent magnet magnetically aligned with one another to additively produce the lines of flux.
8. An alternator comprising
(a) a stator including a power winding,
(b) a rotor having a pair of magnetically separated poles each magnetically coupled to said stator, said rotor journalled for rotation within said stator,
(c) a field winding for inducing lines of flux in a path extending respectively through one of said poles, said power winding, and the other of said poles, and
(d) a permanent magnet mounted in the path of the lines of flux and magnetically aligned therewith to additively contribute to the lines of flux.
9. The alternator as defined in claim 8 further comprising means coupled to an output of said power winding for supplying power to said field winding.
10. The alternator as defined in claim 9 wherein said power supplying means includes a static exciter-voltage regulator.
11. An alternator comprising
(a) a stator,
(b) a rotor having a pair of poles and journalled for rotation within said stator,
(c) current responsive means for inducing flux lines in a continuous path through said stator and rotor, the continuous path of flux lines extending respectively from one of said poles to said stator and to the other of said poles, and (d) self contained means requiring no excitation disposed in the continuous flux path for inducing flux lines therein, which lines of flux of said self contained means are additive to the flux lines of said current responsive means.

12. An alternator comprising
(a) a housing having a pair of end walls,
(b) a field winding mounted in said housing and disposed for inducing a north magnetic pole in one of said walls and a south magnetic pole in the other of said walls,
(c) a permanent magnet mounted in said housing and inducing a magnetic flux which is additive to said magnetic poles,
(d) a stator mounted in said housing, and
(e) a rotor having a pair of rotor poles and mounted for rotation within said housing, one of said rotor poles being magnetically coupled to said one wall and said stator and the other of said rotor poles being magnetically coupled to said other wall and said stator.

13. An alternator as defined in claim 12, wherein said stator includes a power winding.

14. An alternator as defined in claim 13, further comprising means connecting an output of said power winding to said field winding.

15. An alternator comprising
(a) a generally cylindrical housing having a pair of radially inwardly extending walls at opposite ends thereof,
(b) a field winding mounted in said housing and wound for inducing a flux extending between said walls,
(c) a permanent magnet mounted in said housing and positioned to produce a flux additive to that flux produced by said field winding,
(d) a stator mounted in said housing, and
(e) a rotor having a pair of poles and mounted for rotation within said housing, said walls being positioned to define a magnetic air gap with a respective one of said rotor poles and said stator being positioned to define a magnetic air gap with each of said rotor poles.

16. An alternator as defined in claim 15, wherein said stator includes a power winding.

17. An alternator as defined in claim 16, further comprising means connecting an output of said power winding to said field winding.

References Cited

UNITED STATES PATENTS

| | | | |
|---|---|---|---|
| 2,207,304 | 7/1940 | Rosenberg | 310—181 |
| 2,802,959 | 8/1957 | Powers | 310—263 |
| 3,223,866 | 12/1965 | Tiltins | 310—263 |

MILTON O. HIRSHFIELD, *Primary Examiner.*

L. L. SMITH, *Assistant Examiner.*